(No Model.)

G. W. BELFORD.
WIRE CARRIER.

No. 294,843. Patented Mar. 11, 1884.

Witnesses;

H. W. Wells.

Rich'd A. Goldsbrough

Inventor,

George W. Belford, per A. B. Upham,
Attorney in fact

UNITED STATES PATENT OFFICE.

GEORGE W. BELFORD, OF PRINCEVILLE, ILLINOIS.

WIRE-CARRIER.

SPECIFICATION forming part of Letters Patent No. 294,843, dated March 11, 1884.

Application filed May 19, 1883. (No model.)

*To all whom it may concern:*

Be it known that I, GEORGE W. BELFORD, of Princeville, in the county of Peoria, in the State of Illinois, have invented an Improved Wire-Carrier; and I do hereby declare that the following is a full, clear, and exact description thereof, reference being had to the annexed drawings, making a part of this specification, in which like letters of reference refer to like parts, and in which—

Figure 1:
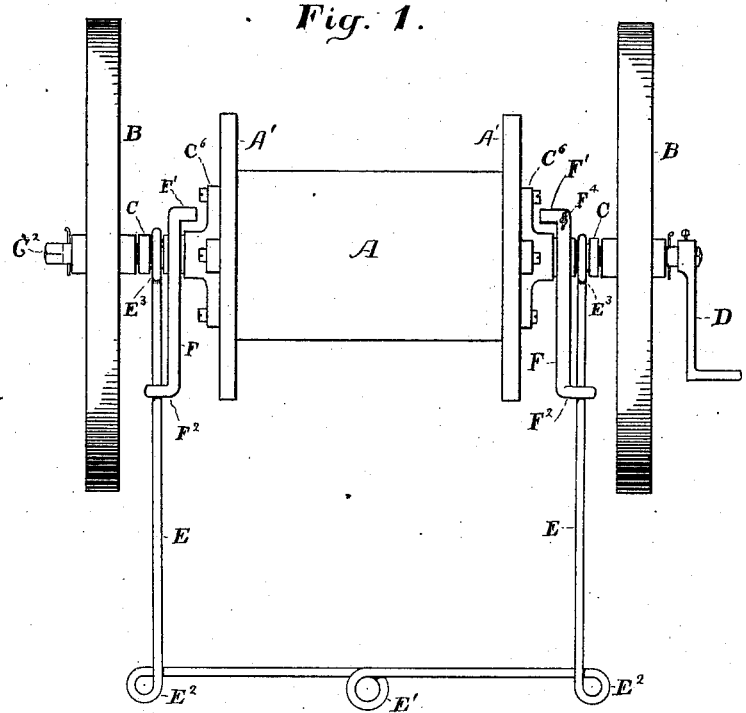
Figure 2:
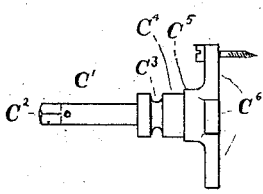
Figure 3:
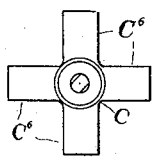
Figure 4:
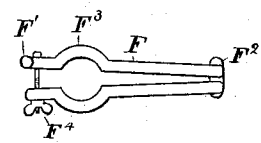

Figure 1 represents a plan view of the machine; Figs. 2, 3, and 4, details.

The object of this invention is the construction of a cheap and simple device, by means of which check-row wire or barbed wire can be easily wound up, unwound, and carried from place to place upon the field. My winding-truck for this purpose consists, essentially, of a spool upon which to wind the wire, of axles projecting rigidly from the ends of said spool, of supporting-wheels turning upon said axles, and of a crank-arm secured to one or both of said axles.

In the drawings, Figure 1 shows the device all complete, in which A A' A' is the spool, and C C the axles, screwed firmly to the ends of said spool. Figs. 2 and 3 show the form of these axles C. The squared end $C^2$ of one of the same is adapted to receive the crank-arm D and be turned thereby, while the part C' is the axle proper, upon which the wheels B revolve. Through the arms $C^6$ run the screws, whereby the axle is secured to the end of the spool.

The tongue E, I usually make of rod-iron, having its ends $E^3$ $E^3$ bent into the annular grooves $C^3$ about the axles C. The axles must of course revolve easily in these eyes $E^3$ $E^3$ of the tongue.

The object of the loops E' $E^2$ $E^2$ will be explained hereinafter.

The dog F clasps its enlarged portion $F^3$ about the axle C at $C^4$, being tightened or loosened thereon by the set-screw $F^4$. Its looped end $F^2$ is held by the tongue E. When it is desired to prevent the spool A from turning, the set-screw $F^4$ is unloosened sufficiently to allow the eye $F^3$ to be pushed onto the enlarged part $C^4$ of the axle. This brings the ear $F'$ between two of the arms $C^6$, which, after tightening said screw $F^4$, holds the axle, and thence the spool from revolving.

In using my winding-truck it operates as follows: To wind the wire upon the spool A the dogs F are in place, as shown in Fig. 1, and the thumb-screws $F^4$ unloosened to allow the axles C to turn easily therein. The tongue E is secured to the ground, or wherever else desired, by pins inserted through the loops $E^2$ $E^2$. After securing the crank-arm D to the axle C, most convenient to the user, one end of the wire is attached to the spool and the winding force applied to the crank.

It will be seen that the wheels B B serve not only the purpose of a truck for transporting the bundle of wire from place to place, but as a supporting-frame and bearings upon which to turn the spool and its contents.

In unwinding the wire from the spool the free end of the wire is fastened at the point desired, the dogs F F tightened upon the axles to prevent the spool from turning faster than necessary to reel out the wire taut and even, and the whole drawn along over the field, unwinding the wire as the truck progresses.

In carrying this truck behind a wagon or other vehicle, it is usually attached thereto by the loop E'.

When manufacturing this machine I intend to make not only the whole complete, but furnish sometimes simply the axles C, crank D, dogs F, and the tongue E, the purchaser supplying the wheels from his cultivator, and the spool already in his possession coming with the check-row wire.

What I claim as my invention is as follows:

1. As a wire-carrier, a spool, A A', in combination with the axles C C, each having squared end $C^2$ and arms $C^6$, whereby the same are bolted to the ends of said spool, suitable wheels, B B, and tongue E, having loop E'.

2. The spool A A', axles C C, each having squared end $C^2$, annular groove $C^3$, and arms $C^6$, whereby the said axles C C are bolted to the ends of said spool, in combination with wheels B B, crank-arm D, tongue E, and dog F, having set-screw, substantially as set forth.

3. Spool A A', axle C, and crank-arm D, in combination with wheels B, tongue E, and dog F, having set-screw F⁴, substantially as and for the purpose specified.

4. Spool A A′, axles C C, having squared ends C², shoulders C⁵, and arms C⁶, in combination with crank-arm D, wheels B B, tongue E, and dog F, having ear F′, as set forth.

5. The spool A A′, axles C C, having squared ends C², grooves C³, shoulders C⁵, and arms C⁶, in combination with a crank, D, wheels B B, tongue E, having loops E² E² E′, and eyes E³ E³, and the dogs F, having ears F′, looped end F², and set-screw F⁴.

In testimony that I claim the foregoing invention I have hereunto set my hand this 14th day of may, 1883.

GEORGE W. BELFORD.

Witnesses:
H. W. WELLS,
NICHOLAS GOLDSBROUGH.